United States Patent Office 3,515,680
Patented June 2, 1970

3,515,680
CONTACT MASSES CONTAINING FAUJASITE
William H. Flank, Broomall, Pa., assignor to Air Products and Chemicals, Inc., Philadelphia, Pa., a corporation of Delaware
No Drawing. Continuation-in-part of applications Ser. No. 540,201, Apr. 5, 1966, and Ser. No. 574,306, Aug. 23, 1966. This application Sept. 29, 1966, Ser. No. 583,078
Int. Cl. B01j 11/40; C10g 11/04
U.S. Cl. 252—455                           6 Claims

ABSTRACT OF THE DISCLOSURE

Supplemental silica is included in the composition employed for making a sodium faujasite by aqueous aging of amorphous aluminum disilicate having reactivity by reason of calcination in the 965–1095° C. range. A higher silica to alumina ratio in the faujasite component of the product is achieved, and is attributable to such supplemental silica.

---

This application is in part a continuation of U.S. application Ser. Nos. 540,201 and 574,306 filed Apr. 5, 1966 and Aug. 23, 1966, respectively, all the disclosures of which are deemed here reiterated. Said Flank et al. applications Ser. Nos. 540,201 and 574,306 have been abandoned by reason of their merger into Ser. No. 781,951, filed Dec. 6, 1968.

This invention is directed to improved contact masses containing faujasite and more particularly is directed to improvement in the faujasite portion of such contact masses.

Synthetic crystalline sodium zeolites having pores of about 4 angstroms have been proposed in U.S. patents including: 2,544,695; 2,992,068; 3,065,054; 3,100,684; and 3,205,037. All said patents are concerned with synthesizing a chabazite type of zeolite (sometimes called Zeolite A) by aqueous alkaline treatment of a meta kaolin prepared by heating kaolin at a temperature such as 500° C., possibly up to about 950° C. Parent application Ser. No. 540,201 points out that the calcination of kaolin at a temperature within the range from about 1010 to 1050° C. produces an amorphous product resembling meta kaolin in X-ray diffraction pattern and chemical analysis, but differing greatly as regards behavior on aging in aqueous alkaline systems. Mixtures of sodium silicate and meta kaolin have been alkaline-aged to synthetic chabazite-type products according to U.S. Pat. 3,185,544. For use as sorbents for isolating straight chain compounds from bulkier branched molecules, the 4 angstrom molecular sieves are preferred. In order to be useful for the cracking of typical gas oil, the crystalline zeolite must have pores of the magnitude of about 10 to 16 angstroms, so that disclosures of synthetic crystalline zeolites of the 4 angstrom pore size type (e.g. chabazite or Zeolite A) are of no interest to cracking technologists. The present case is concerned with contact masses containing faujasite, the principal present use being as a cracking catalyst, but other uses being conceivable.

The conversion of certain fossil fuels, largely the petroleum types, to products amenable to use in power-supplying equipment is one of the present major industries. In this area, fuel-forms suitable for use in internal combustion engines constitute considerable bulk of the products obtained from petroleum stocks. For a wide variety of reasons the production of high-quality desired products in large relative yields from the original source stocks is a matter of continuing concern and interest to commercial processors.

For instance, market demands for gasoline continue to increase and in turn generate a companion industrial demand on ways to provide more gasoline with little increase in investment in processing equipment or in use of raw materials. Over the years industry has sought and found many ways of producing more and better gasoline. Processing has advanced from the low relative yields obtained by recovering the gasoline fraction by distillation of the raw crude, to the production to better quality and higher yields with the introduction of thermal cracking. The introduction of catalytic processing brought an era of even higher quality products of desired types.

The study of suitable catalysts for use in petroleum processing resulted in improvements such as the use of amorphous zeolites. Considerably improved results have been obtained recently through the commercialization of certain catalyst compositions comprising a variety of crystalline zeolites. Particularly advantageous improvements have been achieved by a type of catalyst comprising the synthetic form of faujasite, a rare natural mineral. Such a catalyst is described in industrial terms in an article appearing in Chemical Engineering Progress, vol. 62, No. 6, June 1966 on page 137.

A variety of methods of preparing catalysts comprising synthetic faujasite has been suggested. Effective methods are set forth in copending application, Ser. No. 540,201, filed Apr. 5, 1966. Other methods have been described and are available. The methods of special importance with respect to the present invention are those in which faujasite is synthesized from aluminum disilicate precursor. As described in the above-identified application, such preparational systems contemplate as suitable precursors natural or synthetic hydrated aluminum disilicates substantially free of iron or at least low in iron content.

Such hydrated aluminum disilicate starting material is brought to a suitable state of "reactivity" for the ensuing treatment for the formation of the synthetic faujasite, by calcination at a temperature in the range from about 965° C. to about 1095° C., effecting complete dehydration without substantial sintering. The obtained reactive aluminum disilicate is dispersed in an aqueous sodium hydroxide (or its equivalent) solution to provide a weight ratio of reactive aluminum disilicate to sodium hydroxide equivalent within the range from about 4:1 to about 6:1. The weight ratio of water to sodium hydroxide equivalent is within the range from about 4:1 to about 10:1. Subsequent aging at suitable conditions can result in the formation of synthetic faujasite. For instance, such dispersion may be subsequently aged for an extended time, in the range from 5 hours to 5 days, at about ambient temperature conditions and subsequently aged at an elevated temperature, e.g. in the range from 80° to 120° C., for a further time, such as from about 5 hours to about 5 days. During such aging, synthesis of the faujasite is effected with variations in quantity and quality possible in at least some degree through adjustment of the named and/or other variables. Within the range of the thus-described system, it has now been discovered that an appreciable and useful increase in the ratio of silica to alumina in the faujasite can be obtained.

In accordance with this invention the faujasitic component of faujasite-containing contact masses prepared in accordance with the system described above has a consistently higher silica to alumina ratio when such a dispersion of reactive aluminum disilicate-sodium hydroxide-water, in the range of relative amounts of 4 to 6 parts of aluminum disilicate and 4 to 10 parts of water for each part of sodium hydroxide by weight, has added thereto in a form soluble in the dispersion system, from 2.0 to 10.0% supplemental silica, based on reactive aluminum disilicate weight, and effecting the synthesis of the faujasite-containing mass substantially as described above. The contact masses resulting from the present invention comprise an aluminosilicate matrix and faujasite, the faujasite having a silica to alumina ratio measurably greater than in the absence of said supplemental silica.

Cracking catalysts comprising synthetic faujasites having a silica to alumina unit mol ratio between 2 and 3 (sometimes called Zeolite X) can exhibit attractive properties during the first cycle of cracking, but tend to deteriorate at the elevated temperatures encountered in conventional regeneration. If the silica to alumina unit mol ratio of the faujasite component is between 3.0 and about 3.5, it tends to be generally similar to the unstable cracking catalysts having a silica to alumina unit mol ratio of less than 3 for the faujasite component. Cracking catalysts having a silica to alumina unit mol ratio in the faujasite component above about 3.5 generally have sufficient thermal stability to withstand regeneration conditions encountered during use for several months. The lower limit, whether it be 3.3 or 3.5 or higher, is influenced in part by such factors as the residual sodium content of the cracking catalyst, composition and structure of the matrix, extent of presence of multivalent metallic cations, extent of presence of hydrogen ion form, and extent of decationization. Prolonged usage over a period of many months tends to make the use of a cracking catalyst less efficient by reason of factors such as accumulation of poisonous metallic contaminants, attrition losses, and formation of coke resistant to normal regeneration conditions. As long as the heat stability is sufficient that the loss of activity and selectivity attributable to the hot steam of regeneration is significantly less than the loss of activity and selectivity attributable to other factors, there is little incentive for further increases in thermal stability.

Previously it was assumed that cracking catalysts containing a faujasitic component with a unit mol ratio of silica to alumina of about 4.2 were substantially equivalent to those in which the ratio was 4.8. In the development of the present invention, it was discovered that the higher unit mol ratios of silica to alumina in the faujasitic component contributed significantly to the profitability of the cracking operation, and that it was desirable, not merely to seek a ratio greater than the approximately 3.5 desired for thermal stability, but as much higher as feasible without exorbitant increase in cost of production. With such catalysts the combination of activity and selectivity after months of use is advantageously superior to that of similar cracking catalysts in which the silica to alumina mol ratio, although above 3.5, is lower than in the faujasite components of the catalysts of the present invention.

EXAMPLE I

A slurry was prepared using 146.2 parts by weight of raw uncalcined Georgia kaolin, 62.5 parts by weight of Georgia kaolin calcined in the range of 1010° C. for approximately 2 hours, and 10.4 parts by weight of Georgia kaolin calcined at about 800° C. for about 2 hours, admixed thoroughly with aqueous caustic composed of 73 parts by weight of water and 15.5 parts by weight of sodium hydroxide. The clay ingredients were milled together prior to addition of the caustic solution and the caustic was added with relatively mild agitation during the addition period and at a higher rate of speed for about ten minutes after the addition was completed. A portion of this material was placed in a container and covered with denning oil and placed in a water bath at 37° C. for 40 hours for the preliminary aging step. The sample was then transferred to an oven at 100° C. and kept at 100° C. for 24 hours for the high-temperature aging period. The denning oil prevents any substantial evaporative loss of water during the aging. The oil was decanted from the sample, and the sample was washed once with benzene, once with acetone, and thereafter several times with water until the wash water showed no cloudiness due to the presence of any oleaceous residue. The washed sample was dried in a vacuum at 110° C. A portion of the dried material was ground to pass a 200 mesh sieve, equilibrated in an atmosphere of 50% relative humidity and subjected to X-ray analysis for determination of the silica to alumina ratio by a standard procedure. The result appears in Table 1 below as the control, or Sample A.

Following a preparative procedure substantially the same as that employed for the control, the slurry was prepared to be composed of 62.6 parts by weight high-temperature-calcined kaolin (conveniently designated as 1010° C. $Al_2Si_2O_7$), 10.4 parts by weight of 800° C.-calcined kaolin, 141.2 parts by weight of raw kaolin in an aqueous caustic medium of 73 parts by weight of water and 15.5 parts by weight of sodium hydroxide. To this admixture was added 5.5 parts by weight of soluble silica, commercially available as "Hi-Sil 233." The X-ray analysis for the determination of the silica to alumina unit mol ratio of the faujasite formed in this sample is reported in Table 1 as Sample B. The silica to alumina unit mol ratio was significantly greater notwithstanding the use of only a moderate amount (2.57%, based on total weight of clays used) of supplemental silica.

EXAMPLE II

A preparation similar to that of Example I including the use of 5.5 parts of Hi-Sil 233, and differing only in the use of 146.2 parts by weight of raw kaolin (i.e. 5 more) and 78 parts by weight of water (i.e. 5 more than in Example I) in the original slurry was prepared and processed in a manner identical to the two previous preparations. After final drying, grinding and equilibrating in 50% relative humidity atmosphere the sample was subjected to X-ray analysis with the results reported in Table 1 as Sample C.

TABLE 1

| Sample | Supplemental Silica | | Faujasitic $SiO_2/Al_2O_3$ unit mol ratio |
|---|---|---|---|
| | Percent of 1,010° C. $Al_2Si_2O_7$ | Percent of total clays in mix | |
| A | 0 | 0 | 4.3 |
| B | 8.8 | 2.57 | 5.0 |
| C | 8.8 | 2.51 | 4.8 |

The data of Table 1 demonstrate the feature of increasing the silica to alumina unit mole ratio in the faujasitic component of the end product.

The type and quantity of the soluble silica may be selected from such source materials as the colloidal silicas commercially available, the alkali metal silicates of which sodium silicate is a common example, and other siliceous materials readily soluble in the aqueous caustic menstruum of the faujasite-forming compositions. In general the minimum amount of silica equivalent of such added siliceous component should be no less than about 2% by weight of the reactive aluminum disilicate comprising the starting material to obtain an appreciable increase in the silica to alumina unit mol ratio of the formed faujasite. On the other hand the addition of more than about 10% of silica equivalent tends to change the system in such a manner that the beneficial aspects of the increased silica to alumina mol ratio in the final faujasitic product are reduced and/or obscured by certain other phenomena which may be less desirable, as by the formation of zeolitic components other than the desired faujasitic type.

EXAMPLE III

A dispersion of faujasite-precursor components was prepared consisting of 62.6 parts by weight of 1030° C.-calcined Georgia kaolin (conveniently designated as 1030° C. Al₂Si₂O₇), 10.4 parts by weight of 800° C.-calcined Georgia kaolin, 15.5 parts by weight of sodium hydroxide and 73 parts by weight of water. This dispersion was treated in a manner identical to that described in Example I and the control product analyzed by X-ray diffraction. Part of the analytical results appear in Table 2 below as Sample D.

A different dispersion of faujasite-precursor was prepared as in the preceding paragraph with the added feature of incorporating as a further component of the dispersion 5.5 parts by weight of the same type of supplemental silica as employed in Example II. The processing to product was similar to that in the preceding paragraph. The pertinent data from X-ray analysis appear in Table 2 as Example E.

Still another dispersion of faujasite-precursor materials was prepared consisting of 141.2 parts by weight of raw Georgia kaolin, 62.6 parts by weight of 1030° C.-calcined Georgia kaolin, 10.4 parts by weight of 800° C.-calcined Georgia kaolin, 5.5 parts by weight of supplemental soluble silica, 15.5 parts by weight of sodium hydroxide and 73 parts by weight of water. Processed to product form as in the instance of the preceding two batches, the X-ray analysis of this product is identified below as Sample F in Table 2.

TABLE 2

| Sample | Supplemental Silica | | Faujasitic $SiO_2/Al_2O_3$ mol ratio |
|---|---|---|---|
| | Percent 1030° C. $Al_2Si_2O_7$ | Percent of total clays in mix | |
| D (control) | 0 | 0 | 4.1 |
| E | 8.8 | 7.53 | 5.0 |
| F | 8.8 | 2.57 | 5.0 |

These data illustrate the effective operation of this system substantially independently of even large changes in concentration of some ingredients. Meta kaolin (conveniently designated as 800° C. Al₂Si₂O₇) is not purely diluent. It may alter the nature of the aluminosilicate matrix. These data point to the interrelationship of the more active, faujasite-forming ingredients and the here-taught soluble silica additive.

The advantages of increasing the silica to alumina mol ratio by the procedure herein set forth are delineated in the following example. It is to be understood, of course, that this example is illustrative of the desirable effect and that other factors should not be overlooked as having desirable or undesirable effects on composition quality simply because they are not there dealt with in particularity. It must be understood that other variables such as sodium content, variations in preparative procedure and differences in precursor materials and the like can independently affect the nature and quality of the final product without, however, damage to the contributive nature of the present invention.

EXAMPLE IV

Faujasite-containing samples were taken from the hot-aged stage, subjected to base-exchange treatment with ammonium nitrate solution, washed and dried—all in substantially the same manner as taught in the above-identified Ser. No. 540,204. These several samples are identified in Table 3 below as to faujasitic silica to alumina mol ratio and as to the relative activity and stability factors as indicated by the results obtained by tests of the various catalysts in cracking a standard gas oil at a selected set of conditions as described, and incorporated herein by reference, in application Ser. No. 346,091, filed Feb. 20, 1964, now U.S. Pat. No. 3,337,474.

TABLE 3

| Sample | Faujasitic $SiO_2/Al_2O_3$ mol ratio | Heat treatment (° C.) (4 hrs., 100% steam) | Vol. percent gasoline | Wt. percent conversion |
|---|---|---|---|---|
| G | 4.2 | 730 | 56.7 | 79 |
|  |  | 810 | 52.9 | 60 |
|  |  | 840 | 44.6 | 50 |
| H | 5.2 | 730 | 59.7 | 86 |
|  |  | 810 | 66.0 | 77 |
|  |  | 840 | 62.8 | 68 |
| I | 5.22 | 730 | 64.2 | 83 |
|  |  | 810 | 66.3 | 75 |

These data show definite advantage attributable to the higher faujasitic silica to alumina mol ratio in the catalysts of Samples H and I.

EXAMPLE V

A plurality of experimental samples of cracking catalysts are prepared by steps consisting essentially of: calcining a catalytic grade of raw kaolin at 1030° C. for 4 hours to prepare faujasite-precursor aluminum disilicate; preparing a slurry consisting essentially of 5 parts of such faujasite-precursor aluminum disilicate, 5 parts of water, 1 part of sodium hydroxide, and from 0.01 to 2 parts of supplemental silica having a colloidal size suitable for dispersion in water; subjecting said slurry to aging at 40° C. for 48 hours, there being a subsequent aging step at 95° C. for 24 hours; mixing 8 parts of raw kaolin and 2 parts of meta-kaolin with slurry previously subjected to at least some aging to produce a dough extrudable into strands, and slicing the strands into pellets; drying the pellets at 120° C. for four hours; analyzing the pellets for their sodium faujasite content by X-ray diffraction, and analyzing for the unit mol ratio of silica to alumina in the faujasitic component of the pellets; treating the dried pellets with a hot aqueous solution of an ammonium salt such as ammonium nitrate to exchange substantially all of the sodium ions with ammonium ions; heating the ammonium-exchanged pellets in steam at 810° C. for 4 hours; and cooling the pellets. It is established that if the amount of supplemental silica is less than 2% of the faujasite-precursor aluminum disilicate, the evidence of the alteration of the unit mol ratio of the silica to alumina in the faujasite component is at least somewhat uncertain, and that if the amount of supplemental silica is more than 10% of the faujasite-precursor aluminum disilicate, the presence of non-faujasitic impurities or other deleterious effect is indicated and the cracking effectiveness is impaired. Thus, of the range from 0.01 to 2 parts of supplemental silica per 5 parts of 1030° C. aluminum disilicate, the range from 0.1 to 0.5 part is the operable range.

It is established that the temperature for the calcination of the halloysite, kaolin, or equivalent hydrated aluminum disilicate is desirably in the range from 1010° C. to 1050° C., or 1030° C.±20° C. As explained in parent case Ser. No. 540,201, faujasite by alkaline aging of calcined aluminum disilicate may be attainable with calcination temperatures from about 965° C. to about 1095° C.

Obviously, many modifications and variations of the invention as hereinbefore set forth may be made without departing from the spirit and scope thereof, and therefore only such limitations should be imposed as are indicated in the appended claims.

What is claimed is:
1. In the method of preparing a contact mass containing from 5% to 80% of faujasite supported in an aluminosilicate matrix, which includes the steps of:
  (a) preparing reactive aluminum disilicate by calcining hydrated aluminum disilicate at a temperature in the range from 965 to 1095° C. for from 0.1 to 10 hours,
  (b) incorporating the said reactive aluminum disilicate, as major precursor for the synthesis of faujasite, in an aqueous alkaline dispersion comprising one part by weight of sodium hydroxide equivalent, 4 to 6 parts by weight of reactive aluminum disilicate, and 4 to 10 parts by weight of water, (c) transforming said dispersion into a faujasite-containing composition by steps including a first aging step at a temperature in the range of 10° to 50° C. for a time in the range of 5 hours to 5 days and thereafter to a second aging step at a temperature in the range of 80° C. to 120° C. for a further time period in the range of 5 hours to 5 days, and (d) subjecting the faujasite-containing composition to treatment eventuating in the desired contact mass containing faujasite in an aluminosilicate matrix, the improvement in step (b) of modifying the aqueous alkaline dispersion by the inclusion therein of supplemental silica soluble in the aqueous alkaline dispersion, said supplemental silica constituting from 2% to about 10% by weight of the reactive aluminum disilicate; and obtaining as an end result thereof a contact mass in which the faujasite has enhanced properties due at least in part to a silica to alumina mol ratio in the faujasite structure measurably larger than would otherwise obtain.

2. The method of preparing a faujasite-containing petroleum cracking catalyst, comprising:

(a) forming an aqueous alkaline dispersion comprising one part by weight of sodium hydroxide equivalent, 4 to 10 parts by weight of water, 4 to 6 parts by weight of reactive aluminum disilicate prepared by calcining hydrated aluminum disilicate in the range from about 965° to about 1095° C. for from about 0.1 to about 10 hours, and silica soluble in aqueous alkali, said supplemental silica constituting 2 to 10 percent by weight of the reactive aluminum disilicate, (b) transforming the dispersion into a composition containing synthesized faujasite by steps comprising a first aging for a time in the range of 5 hours to 5 days at a temperature in the range of 10° to 50° C. and thereafter to a second aging for a time in the range of 5 hours to 5 days at a temperature in the range of 80° to 120° C., (c) treating the faujasite-containing composition to effect removal of the main portion of sodium ions by base exchange with ammonium ions, (d) calcining the base-exchanged composition at a temperature in the range of 900 to 1600° F., (e) and recovering calcined product as the faujasite-containing petroleum cracking catalyst 3. The process in accordance with claim 1 wherein the supplemental silica is a colloidal silica.

4. The process in accordance with claim 1 wherein the supplemental silica is in the form of an alkali metal silicate.

5. The process in accordance with claim 4 wherein the alkali metal is sodium.

6. The process in accordance with claim 1 in which the hydrated aluminum disilicate is calcined at a temperature in the range from 1010° C. to 1050° C.

References Cited

UNITED STATES PATENTS

| 3,119,660 | 1/1964 | Howell et al. | 23—112 |
| 3,185,544 | 5/1965 | Maher | 23—112 |
| 3,325,398 | 6/1967 | Ashwill | 252—455 X |
| 3,338,672 | 8/1967 | Haden et al. | 252—455 X |
| 3,341,284 | 9/1967 | Young | 252—455 X |
| 3,346,512 | 10/1967 | Gladrow et al. | 252—455 |
| 3,391,994 | 7/1968 | Haden et al. | 23—112 |

DANIEL E. WYMAN, Primary Examiner

C. F. DEES, Assistant Examiner

U.S. Cl. X.R.

23—113